(12) United States Patent
Lee et al.

(10) Patent No.: US 12,323,470 B2
(45) Date of Patent: Jun. 3, 2025

(54) SYSTEMS AND METHODS FOR HANDLING CALLS IN MULTIPLE BROWSER TABS

(71) Applicant: RingCentral, Inc., Belmont, CA (US)

(72) Inventors: David Tai-Wei Lee, Belmont, CA (US); Lueqin Wen, Xiamen (CN); Yicong Ji, Zhangzhou (CN); Zenghao Hou, Fujian (CN); Srikumar Subramaniam, Cupertino, CA (US)

(73) Assignee: RingCentral, Inc., Belmont, CA (US)

( * ) Notice: Subject to any disclaimer, the term of this patent is extended or adjusted under 35 U.S.C. 154(b) by 290 days.

(21) Appl. No.: 18/075,849

(22) Filed: Dec. 6, 2022

(65) Prior Publication Data

US 2023/0308491 A1     Sep. 28, 2023

(30) Foreign Application Priority Data

Mar. 22, 2022   (WO) ................ PCT/CN2022/082158

(51) Int. Cl.
*H04L 65/1059*   (2022.01)
*H04L 65/1104*   (2022.01)
*H04L 65/1108*   (2022.01)

(52) U.S. Cl.
CPC ...... *H04L 65/1059* (2013.01); *H04L 65/1104* (2022.05); *H04L 65/1108* (2022.05)

(58) Field of Classification Search
None
See application file for complete search history.

(56) References Cited

U.S. PATENT DOCUMENTS

| | | | |
|---|---|---|---|
| 10,783,527 B2* | 9/2020 | Tsai | G06Q 30/0264 |
| 2013/0196760 A1* | 8/2013 | Patel | G06Q 20/04 |
| | | | 463/31 |
| 2021/0345013 A1* | 11/2021 | Feng | H04N 21/47202 |

FOREIGN PATENT DOCUMENTS

| | | |
|---|---|---|
| CN | 107979564 A | 5/2018 |
| CN | 108369600 A | 8/2018 |

OTHER PUBLICATIONS

PCT/CN2022/082158 filed Mar. 22, 2022 PCT Search Report and Written Opinion dated Nov. 30, 2022 9 pages.

* cited by examiner

*Primary Examiner* — Robert M Morlan (57) ABSTRACT

The present disclosure provides for a computer-implemented method for handling communications across tabs. The method comprises detecting a first communication via a first tab within an application; identifying an initiation of a second communication via a second tab within the application; and responsive to identifying the initiation, causing to pull the first communication from the first tab to the second tab such that the first communication and the second communication are carried out via the second tab.

20 Claims, 8 Drawing Sheets

SYSTEMS AND METHODS FOR HANDLING CALLS IN MULTIPLE BROWSER TABS

RELATED APPLICATIONS

This application is a Non-Provisional U.S. application and claims the benefit and priority to the PCT Application PCT/CN2022/082158 that was filed on Mar. 22, 2022, and which is incorporated herein by reference in its entirety.

TECHNICAL FIELD

The present disclosure relates generally to the field of computer supported communications. Specifically, the present disclosure relates to systems and methods for handling communications across tabs within an application.

BACKGROUND

With constant enhancements to computer technologies, browsers and other browser-like applications have become more functional and comprehensive, especially within the realm of communications where browsers-based calls and conferences have increased in demand. Due to the popularity of these available functionalities, the applications are used more frequently and often simultaneously. As a result, most current browsers are capable of multiple instances (which are commonly referred to as "tabs") to maintain different connections to various communication services simultaneously. For example, it is common to find a user in a sales department engaged in a call to a potential customer in one tab while engaged in a second call to other colleagues in the same sales department.

However, several simultaneous connections via different tabs create difficulties. For example, when a user uses different tabs of a browser to call different colleagues or customers, the graphical user interface (GUI) is limited in how much information can be displayed at any given time, which leads the user to search each of the tabs for the desired on-going communication. A user may also unintentionally close the desired tab with an important call while fumbling through these multiple tabs. Importantly, each new tab of the browser that is opened consumes additional memory, such as Random Access Memory (RAM), and computing resources of Central Processing Unit (CPU). The problem of resource usage compounds when multiple tabs each carry active communications. These problems typically lead to lags, instability of the system, and other performance issues.

Thus, there is a need for systems and methods that provide a more efficient way to handle multiple communications within an application.

SUMMARY

The appended claims may serve as a summary of the invention.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:

1.0 GENERAL OVERVIEW
2.0 STRUCTURAL OVERVIEW
3.0 FUNCTIONAL OVERVIEW
4.0 PROCEDURAL OVERVIEW 1.0 General Overview The current disclosure provides a technological solution to the technological problem of handling communications across multiple tabs of an application.

Currently, various applications are capable of handling multiple communications to a single service or multiple services. With respect to browser applications that have the tab feature, a browser can handle separate and independent connections through each tab. Consequently, multitasking users often make separate calls in different tabs of the browser. However, too many active communications in different tabs may lead to a high consumption of computing resources. In some cases, such consumption may merely result in an incremental increase in electricity consumption of the computing device. Notwithstanding, that could be extremely critical for wireless devices, like phones, tablets, and laptops, because it affects the battery life of such devices. In other cases, the consumption of the computing resources may be critical in terms of computational resources, especially for low-performance devices, since an overload of RAM or CPU causes lag and/or instability in the functionality of the device. A solution is therefore needed for the efficient handling of multiple communications in tabs within an application.

However, the present disclosure solves this problem by providing a more efficient way to handle multiple communications within an application. In one aspect of the present disclosure, a computer-implemented method for handling communications across tabs is proposed. The method comprises the steps of: detecting a first communication via a first tab within an application; identifying an initiation of a second communication via a second tab within the application; and responsive to identifying the initiation, causing to pull the first communication from the first tab to the second tab such that the first communication and the second communication are carried out via the second tab.

Therefore, the current solution provides the technological benefit of consolidating communications in one tab, thereby reducing the consumption of computational resources of devices, which results in prolonged battery life and stability of functionality.

As a further achievement, such consolidation reduces the probability of mistakenly closing or selecting a wrong tab by a user. Additionally, due to the fact that users are able to view and handle all communications in one tab, the probability of that user choosing the wrong communication is essentially reduced to a minimum.

In one embodiment of the present disclosure, the first communication and the second communication are Web Real-Time Communication (WebRTC).

In another embodiment of the present disclosure, pulling the first multimedia communication from the first tab to the second tab comprises the following: switching the first WebRTC communication into a first Session Initiation Protocol (SIP) communication; and pulling the first SIP communication from the first tab to the second tab such that the first SIP communication and the second WebRTC communication are carried out via the second tab.

In another embodiment of the present disclosure, pulling the first multimedia communication from the first tab to the second tab comprises: pulling the first WebRTC communication to the second tab such that the first WebRTC communication and the second WebRTC communication are carried out via the second tab using WebRTC multi-peer communications, where each peer communication represents peer-to-peer communication.

In another embodiment of the present disclosure, the application is a client application for accessing web application. In one embodiment, the application is a browser application.

In yet another embodiment of the present disclosure, the method further comprises the following: responsive to pulling the first communication from the first tab to the second tab, closing the first tab.

According to a second aspect of the present disclosure, a non-transitory, computer-readable medium is proposed. The medium stores a set of instructions that, when executed by a processor, cause the following: detecting a first communication via a first tab within an application; identifying an initiation of a second communication via a second tab within the application; and responsive to identifying the initiation, causing to pull the first communication from the first tab to the second tab such that the first communication and the second communication are carried out via the second tab.

According to a third aspect of the present disclosure, a system for handling communications across tabs is provided, the system comprises a processor; a memory operatively connected to the processor and storing instructions that, when executed by the processor, cause: detecting a first communication via a first tab within an application; identifying an initiation of a second communication via a second tab within the application; and responsive to identifying the initiation, causing to pull the first communication from the first tab to the second tab such that the first communication and the second communication are carried out via the second tab.

2.0 Structural Overview

Figure 1:
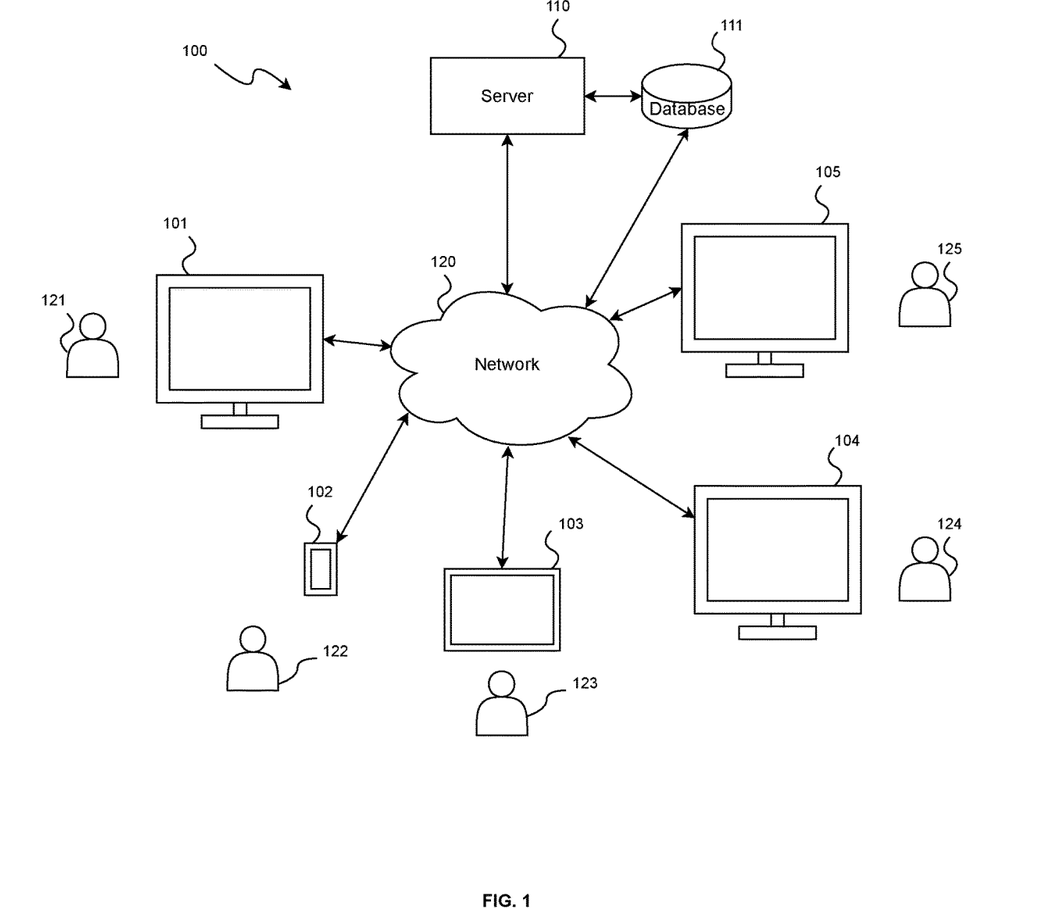
FIG. 1 is a diagram of a communication system, according to an example embodiment of the present disclosure.

FIG. 1 shows a diagram of communication system suitable for realization of one of the embodiments of the current disclosure.

The communication system 100 facilitates communications between user devices 101, 102, 103, 104, and 105 each associated with corresponding user 121, 122, 123, 124 and 125 and a server 110. Network 120 may be any type of networks that provides communications or facilitates the exchange of information between the server 110 and user devices 101, 102, 103, 104, and 105. For example, network 120 broadly represents a one or more local area networks (LANs), wide area networks (WANs), metropolitan area networks (MANs), global interconnected internetworks, such as the public internet, or other suitable connection(s) or combination thereof that enables communication system 100 to send and receive information between the user devices 101, 102, 103, 104, and 105 and the server 110. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats, and may further support a variety of services and applications for user devices 101, 102, 103, 104, and 105.

In particular, user devices may be the desktop user service 101, 104 and 105 executing any of known operational environment, e.g., MS Windows, MacOS, Linux or Unix. At the same time, other user devices may be the mobile telephones, such as smartphone devices, e.g., user device 102, or tablets, e.g., user device 103, executing any of known operational environment, e.g., Android OS or iOS.

Figure 2:
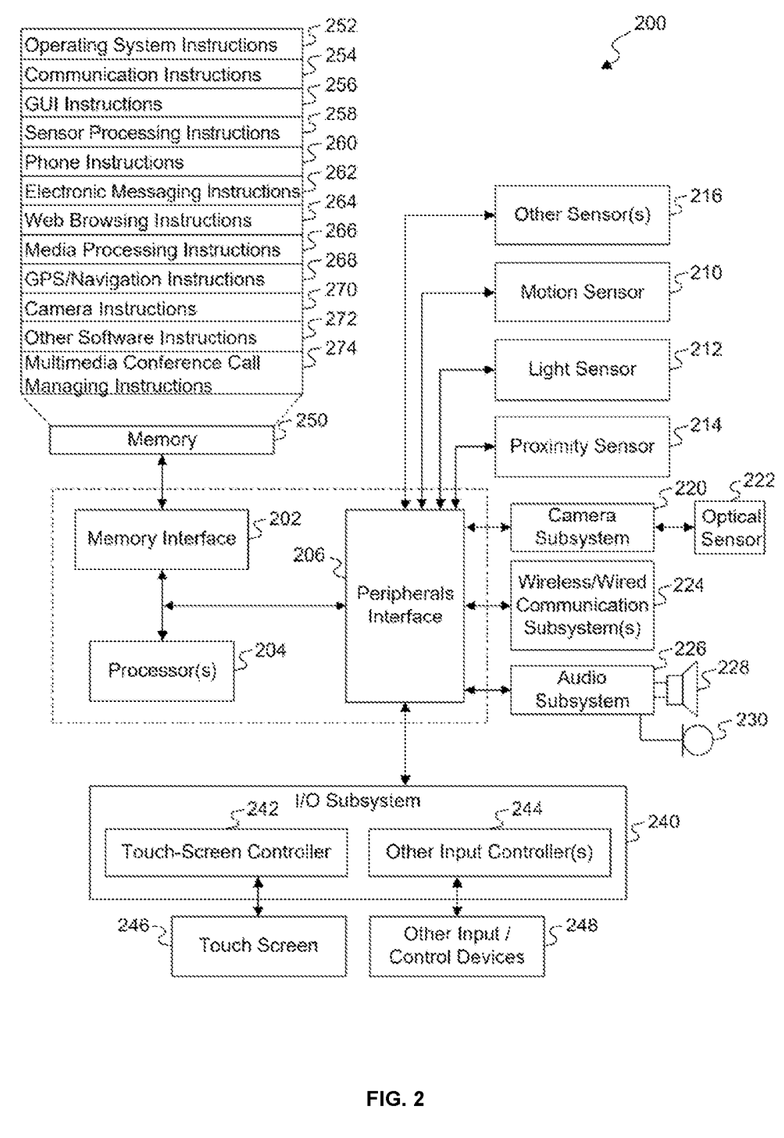
FIG. 2 is a diagram of a user device, according to an example embodiment of the present disclosure.

FIG. 2 is a diagram of an example of a user device 200 for use in a communication system, such as communication system 100. The user device 200 can be used to implement computer programs, applications, methods, processes, or other software to perform embodiments described in the present disclosure, such as the user devices 101, 102, 103, 104, and 105. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices, e.g., user device 102, or into tablets, e.g., user device 103. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions.

In some embodiments, the communication instructions 254 represent or include software applications to facilitate connection with the communication server 110 that connects plurality of user devices. The electronic messaging instructions 262 may include a software program to generate communication requests to the communication server 110 for carrying out communications. Further, the electronic messaging instructions 262 may include software applications to receive communication requests from the communication server 110. The graphical user interface instructions 256 may include a software program that facilitates display of the communication notifications to a user associated with the user device and facilitates the user to provide user input, and so on.

In the presently described embodiment, the instructions cause the processor 204 to perform one or more functions of the disclosed methods. For example, the instructions may cause the audio subsystem 226 to capture an audio and cause the wireless communication subsystem(s) 224 to transmit the audio to the communication server 150. In some embodiments, the instructions may cause the processors 204 to determine an importance of the communications based on received communication information.

Each of the above identified instructions and software applications may correspond to a set of instructions for performing one or more functions described above. These instructions may be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

The user device 200 of FIG. 2 or the user devices 101, 102, 103, 104, and 105 of FIG. 1 may execute various applications stored in the memory 250. In one embodiment, the application may be a browser application or any other suitable client application for accessing web applications. The browser may be, but is not limited to, Mozilla Firefox, Google Chrome, Microsoft Edge, Apple Safari or Opera Browser. One criterion for the browser or the client application that could be used for the present disclosure is that the browser or the client application should be capable of creating different instances, such as tabs.

Figure 3:
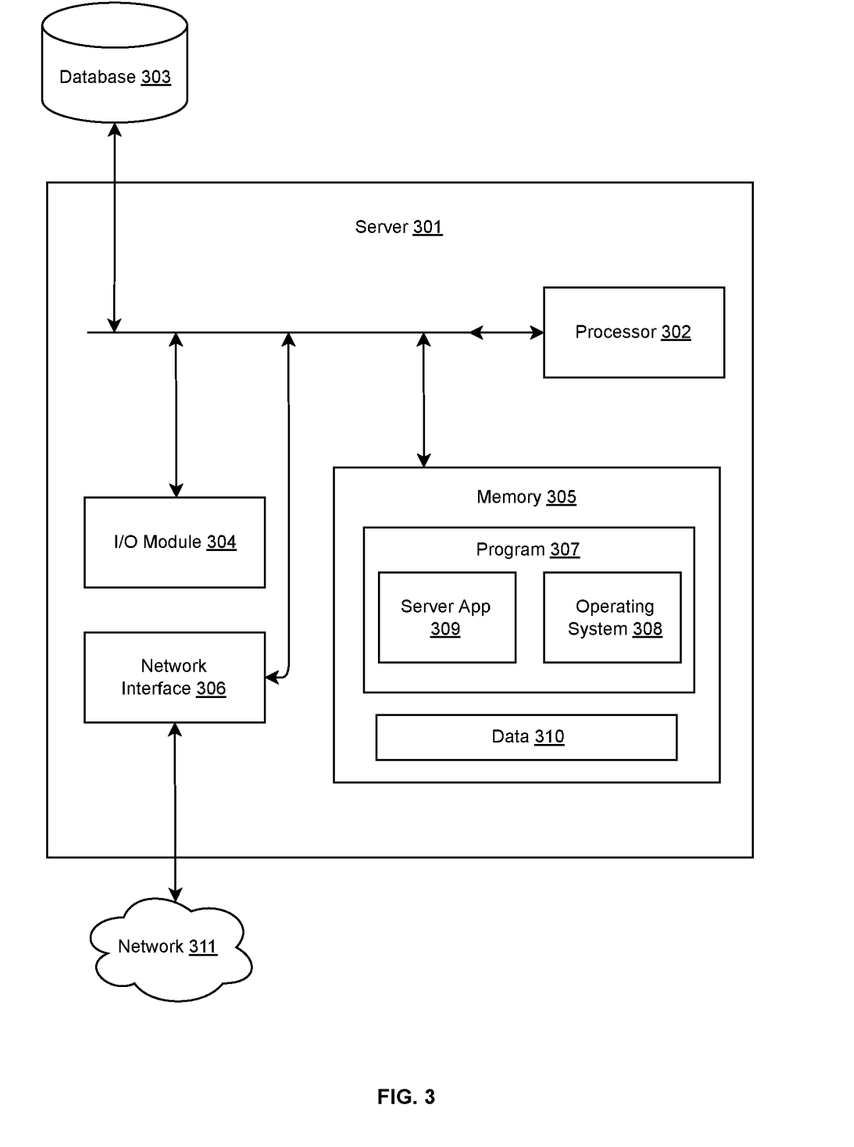
FIG. 3 is a diagram of a server, according to an example embodiment of the present disclosure.

FIG. 3 is a block diagram that illustrates an example of a collaboration server 301 suitable for implementing the disclosed systems and methods. The collaboration server 301 may include at least one processor, e.g., processor 302. The processor 302 may be operably connected to one or more databases (e.g., database 303), an input/output module 304, memory 305, and network interface device 306.

I/O module 304 may be operably connected to a keyboard, mouse, touch screen controller, and/or other input controller(s) (not shown). Other input/control devices connected to I/O module 304 may include one or more buttons, rocker switches, thumb-wheel, infrared port, USB port, and/or a pointer device such as a stylus.

Processor 302 may also be operably connected to memory 305. Memory 305 may include high-speed random access memory and/or non-volatile memory, such as one or more magnetic disk storage devices, one or more optical storage devices, and/or flash memory (e.g., NAND, NOR).

Memory 305 may include one or more programs 307. For example, memory 305 may store an operating system 308, such as DRAWIN, RTXC, LINUX, iOS, UNIX, OS X, WINDOWS, or an embedded operating system such as VXWorkS. Operating system 308 may include instructions for handling basic system services and for performing hardware dependent tasks. In some implementations, operating system 308 may comprise a kernel (e.g., UNIX kernel).

Memory 305 may also store one or more server applications 309 to facilitate communicating with one or more additional devices, one or more computers and/or one or more servers. Server applications 309 may also include instructions to execute one or more of the disclosed methods.

Memory 305 may also store data 310. Data 301 may include transitory data used during instruction execution. Data 301 may also include data recorded for long-term storage.

Each of the above identified instructions and applications may correspond to a set of instructions for performing one or more functions described above. These instructions need not be implemented as separate software programs, procedures, or modules. Memory 305 may include additional instructions or fewer instructions. Furthermore, various functions of server 301 may be implemented in hardware and/or in software, including in one or more signal processing and/or application specific integrated circuits.

Communication functions may be facilitated through one or more network interfaces (e.g., interface 306). Network interface 306 may be configured for communications over Ethernet, radio frequency, and/or optical (e.g., infrared) frequencies. The specific design and implementation of network interface 306 depends on the communication network(s) over which server 301 is intended to operate. For example, in some embodiments, server 301 includes wireless/wired network interface 306 designed to operate over a GSM network, a GPRS network, an EDGE network, a Wi-Fi or WiMax network, and a Bluetooth® network. In other embodiments, server 301 includes wireless/wired network interface 306 designed to operate over a TCP/IP network. Accordingly, network 311 may be any appropriate computer network compatible with network interface 306.

The various components in server 301 may be coupled by one or more communication buses or signal lines (not shown).

3.0 Functional Overview

Figure 4:
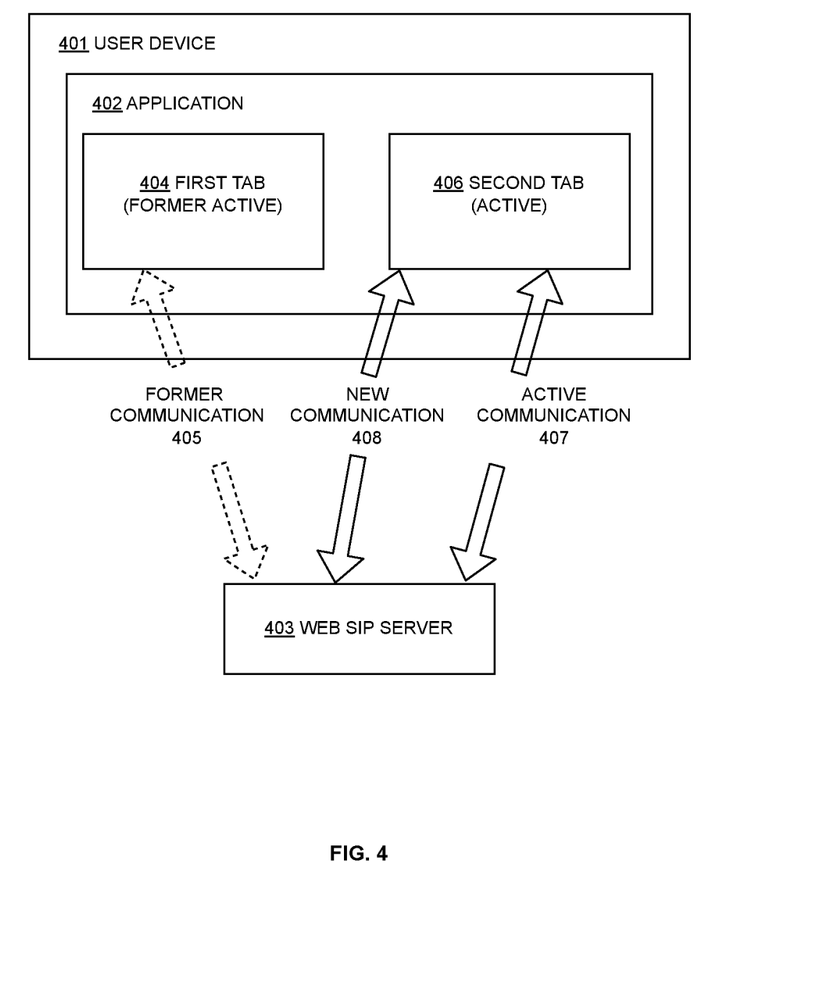
FIG. 4 is a diagram of communications between a user device and a server, according to an example embodiment of the present disclosure.

FIG. 4 shows a diagram of communications between a user device and a server according to one embodiment of the current disclosure. The user device 401 (e.g., one of the above-mentioned user devices 101, 102, 103, 104, and 105 of FIG. 1 or the user device 200 of FIG. 2) stores an application 402 in a memory (e.g., memory 250 of FIG. 2) and is executed by a processor (e.g., the processor 204 of FIG. 2). When executed, the user device 401 is connected to a web SIP server 403 (e.g., one of the above-mentioned server 110 of FIG. 1 or server 301 of FIG. 3) via the application 402. When running, the application 402 may include one or more tabs. FIG. 4 illustrates a non-limiting example with two tabs. A first tab 404 is engaged in a first active communication (former communication 405). In this example embodiment, the user instructs, for example, via the touch screen controller 242 of the user device 200 of FIG. 2, the application to open a second tab 406 and establish another communication (active communication 407). According to the current disclosure, the former communication 405 is pulled to the second tab in order to unite all communications in the single active tab. Thus, a new communication 408 is established between the server 403 and the second tab 406. In this example embodiment, if SIP is utilized to establish a SIP call communication between the server 403 and user device 401, the new communication 408 may be initiated according to instructions of the application 402 stored on the user device 401 by sending the appropriate SIP requests to the server 403.

In a particular embodiment, the former communication 405 carried out within the first tab 404 is a first SIP call. At some point, the user wants to make another call and puts the first SIP call on hold. In order to put the first SIP call on hold, the user instructs the user device 401 to hold the first SIP call, e. g., via the I/O subsystem 240. In response, the user device 401 sends a SIP INVITE command containing instructions to hold the first call to the web SIP server 403. The Real-time Transport Protocol (RTP) channel between the user device 401 and a callee device of the first SIP call is paused, but communications between the callee device and the web SIP server 403 and communication between the user device 401 and the web SIP server 403 are still maintained by transmitting the SIP command. Then the user opens the second tab 406, which is now an active tab, and initiates a second SIP call by instructing the user device 401, e. g., via the I/O subsystem 240, to send a new SIP INVITE command to the web SIP server 403 to initiate the second SIP call, which now can be considered an active communication 407. In response to receiving the new SIP INVITE command, the web SIP server 403 then establishes the communication with a callee device of the second call as it is stipulated by the SIP protocol itself.

According to the current disclosure, in response to receiving the command to establish the active communication 407 in the second tab 406, the web SIP server 403 further instructs the user device 401 to terminate the former communication 405 of the first tab 404 and establish the new communication 408 for the second tab 406 with the same characteristics of the former communication 405, so that the RTP channel between the user device 401 and a callee device of the first SIP call can be resumed after user instruct the user device 401 to unhold the first call.

While the example of FIG. 4 illustrates disconnecting a single former communication 405 and connecting a single new communication 408, the example is not intended to be limiting. Any number of former communications 405 from any number of tabs may be disconnected while any number of new communications 408 may be established under a single tab. For example, two former communications 405 from two separate tabs may be disengaged while two corresponding new communications 408 may be established for unified management under the second tab 406.

In this particular embodiment, any of the communications mentioned in relation to FIG. 4 may be any communications between a user device and a server, such as client-server communication, e.g., between user device 401 and web SIP server 403. Since SIP communications, such as calls, are often initiated or terminated upon a user's request, the signals that establish or terminate a communication with the server 403 is sent via software using the processor of the user device 401. According to other embodiments, the new communication 408 may be initiated according to instructions of the server application stored on a memory of a server (e.g., the memory 305 of the server of FIG. 3). Therefore, in other embodiments, the processor that may be one of user device processor or server processor.

It is appreciated that, aside from SIP, any other suitable protocol could be used for establishing communications, e.g., WebRTC, REST or any proprietary signaling protocol.

Furthermore, in some embodiments, the communication may be a communication between user devices or peer-to-peer communication. In the embodiment, the communications could be WebRTC communications using WebRTC multi-peer communications, where each peer communication represents peer-to-peer communication.

Figure 5:
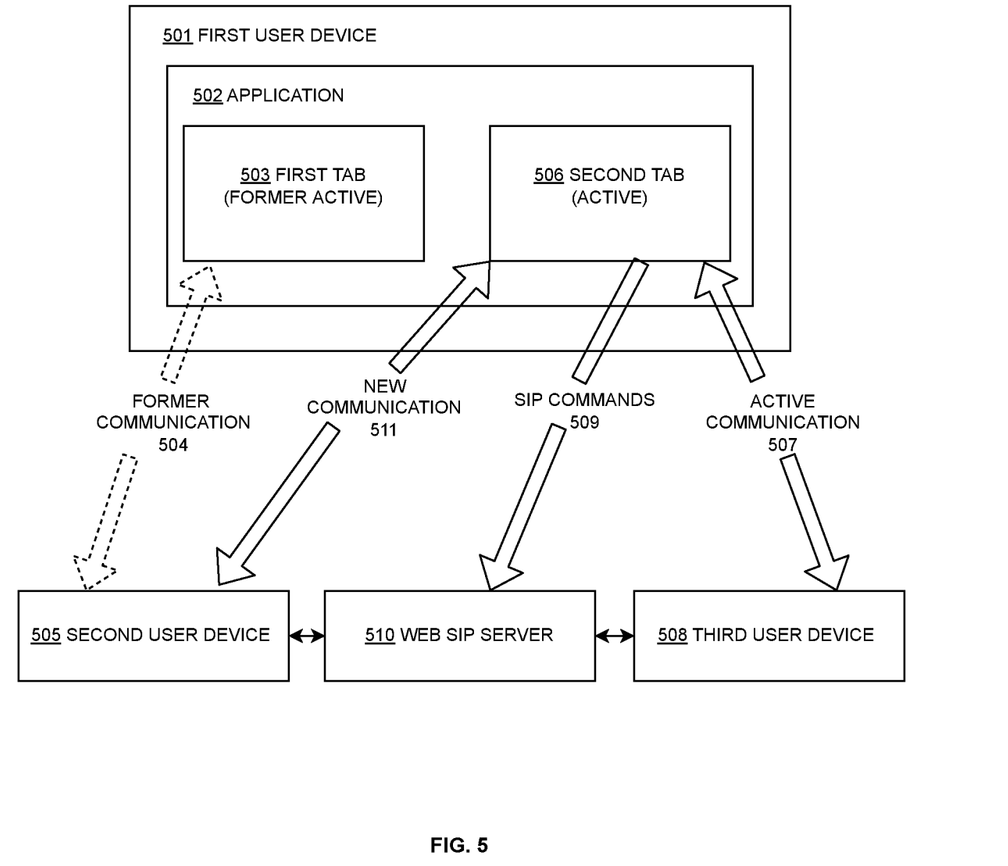
FIG. 5 is a diagram of communications between user devices and a server, according to an example embodiment of the present disclosure.

FIG. 5 shows a diagram of communications between user devices and a server according to another embodiment of the current disclosure. The first user device 501 (e.g., one of the above-mentioned user devices 101, 102, 103, 104, and 105 of FIG. 1 or the user device 200 of FIG. 2) stores an application 502 in a memory (e.g., memory 250 of FIG. 2) which can be executed by a processor (e.g., the processor 204 of FIG. 2). When running, the application 502 may include one or more tabs. FIG. 5 illustrates a non-limiting example with two tabs. A first tab 503 is engaged in a first active communication (former communication 405) with a second user device 505. The second user device 505 may be another one of the above-mentioned user devices 101, 102, 103, 104, and 105 of FIG. 1, and has the same characteristics as the first user device 501 or the user device 200 of FIG. 2. The former communication 504 may be a peer-to-peer WebRTC communication or a WebRTC call established between the first user device 501 and the second user device 505 via the first tab 502. In this example embodiment, the WebRTC communication was established by means of a web SIP server 510 (e.g., one of the above-mentioned server 110 of FIG. 1 or server 301 of FIG. 3).

The user of the first user device 501 may decide to open a second tab 506 within the application 502, which now can de be considered as the active tab. In this example embodiment, the user of the first user device 501 instructs the application 502 (e. g., via the touch screen controller 242 of the user device 200 of FIG. 2) to open a second tab 506 and establish another communication (active communication 507) via the second tab 506. The active communication 507 may be a WebRTC call between the first user device 501 and a third user device 505 established by means of the web SIP server 510. The web SIP server 510 may include one or more servers interconnected between each other. FIG. 5 illustrates a non-limiting example with one server. According to the current disclosure, in response to establishing the active communication 507 within the second tab 506, the processor of the first user device 501 pulls the WebRTC call between the first user device 501 and the second user device 505 from the first tab 503 to the second tab 506. In this example embodiment, the processor of the first user device 501 sends SIP commands 509 to the web SIP server 510 to disconnect the first tab 503. The web SIP server 510, in response to the SIP commands 509 from the first user device 501, signals to the second user device 505 that the first user device 501 desires to end the former communication 504 established between the first user device 501 and the second user device 505. The SIP commands 509 sent by the processor of the first user device 501 further comprises a request to establish a new communication 511 between the first user device 501 and the second user device 505 via the second tab 506. The new communication 511 may be the same WebRTC call between the first user device 501 and the second user device 505 via the second tab 506 but on hold. Thus, both the WebRTC call between the first user device 501 and the second user device 505 and the WebRTC call between the first user device 501 and the third user device 505 are carried out via the second tab 506.

4.0 Procedural Overview

Figure 6:
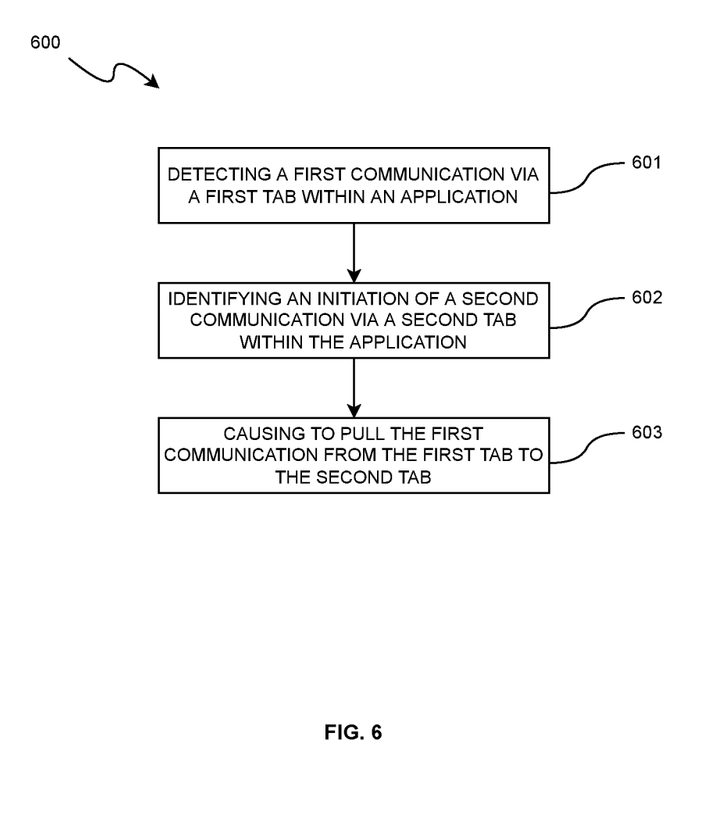
FIG. 6 is a flowchart of a method for handling calls in multiple tabs, according to an example embodiment of the present disclosure.

FIG. 6 shows a flowchart of an example method 600 for handling communications across tabs. Method 600 may be implemented using a general-purpose computer including a processor, e.g., collaboration server 301 of FIG. 3 or user device 200 of FIG. 2. Alternatively, a special-purpose computer may be built for implementing method 600 using suitable logic elements.

At step 601, the processor detects a first communication via a first tab within an application. The processor may be one of the processor 204 of the user device 200 of FIG. 2 or the processor 302 of the server 301 of FIG. 3. In both cases, the processors receive signals indicating that the user device 200 and the server 302 are communicating via the first tab of an application that is executed on the user device 200.

At step 602, the processor identifies an initiation of a second communication via a second tab within the application. It is appreciated that, a user may open the second tab within the application without intending to establish communication with the server within the second tab. In an embodiment, where the application is a browser application, the user may open the second tab and any other tabs for various reasons besides establishing new communication to the server. When the user decides to establish a second communication with the server, the processor identifies the session initiation. As in the previous step, the processor may be one of the processor 204 of the user device 200 or the processor 302 of the server 301. The processor 204 of the user device 200 receives signals that indicate the initiation of the second communication, for example, from the I/O subsystem 240 of the user device 200. Then, said signals may be sent via the wireless/wired communication subsystems 224 over the network (e.g., network 120 of FIG. 1) to the server 301, so that the processor 302 identifies the initiation of the second communication. As a non-limiting examples, the initiation of the second communication maybe similarly performed like for the embodiment disclosed with reference to FIG. 4.

At step 603, the processor 204 causes to pull the first communication from the first tab to the second tab. In response to initiation of the second communication via the second tab the processor may terminate the first communication via the first tab and establish the same communication via the second tab.

Method 600 may include additional steps. For example, method 600 may further include closing the first tab. In a particular embodiment, all the information was transferred to the second tab. For example, the first communication may include multiple communications, such as WebRTC communication for peer-to-peer communication with another user device, and a SIP communication for client-server communication with a server. In this scenario, both the WebRTC communication and the SIP communication are pulled to the second tab. In another embodiment, the user may manually type additional information with regard to the communication of the first tab (e. g., home address of the callee, substitute phone number, or a callee's question) in a user interface of the first tab. In this scenario, that additional information may be transmitted to the second tab via local storage of the browser application.

Figure 7:
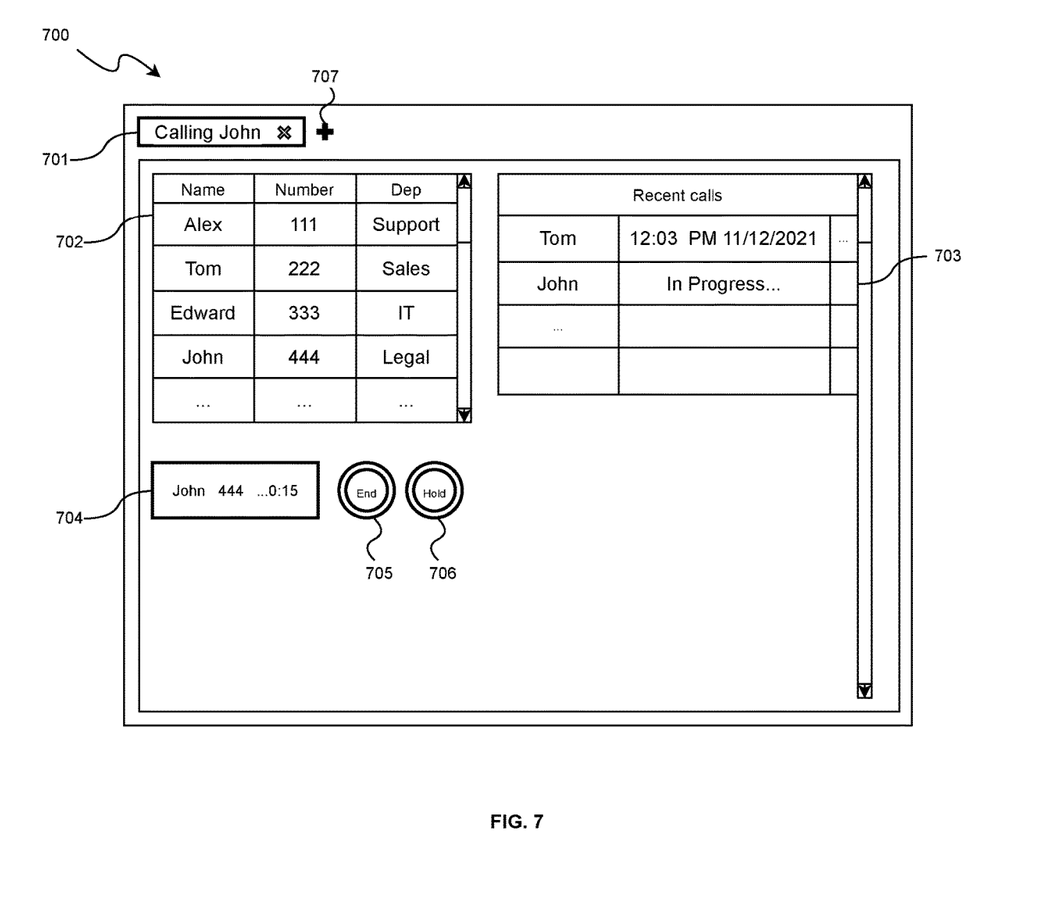
FIG. 7 is an example GUI of the application, according to an example embodiment of the present disclosure.

FIG. 7 shows an example GUI 700 of an application for handling communications across tabs. GUI 700 is a part of a client application for making calls over the network (e.g., the network 120 of FIG. 1). The application may be the application 402 of FIG. 4 executed on the user device 200 of FIG. 2. GUI 700 may comprise a first tab indicator 701, a phonebook panel 702, a recent calls panel 703, an ongoing call panel 704, action buttons 705, 606 and an open new tab button 707.

As indicated on the label of the first tab indicator 701, the GUI 700 illustrates an example embodiment of a user calling John. To make the call, the user may select John's name from the phonebook panel 702 where John's department (i.e. Legal) and an associated phone number 444 is displayed. Additionally, the phonebook panel 702 includes other records for various contacts, such as Alex in the Support Department with phone number 111, Tom in the Sales Department with phone number 222, and Edward in the IT Department with phone number 333. The recent call panel 703 shows a recent call list. In the example of FIG. 7, the recent call panel 703 indicates that on Nov. 12, 2021 the user made a call to Tom at 12:03 PM. The recent call panel 703 also indicates that a call to John is currently in progress.

The ongoing call panel 704 indicates that the current call to John has lasted 15 seconds. The action buttons in this case offer the user an option to end the call (action button 705) and an option to hold the call (action button 706). Additionally, on the top of the GUI 700, the open tab button 707 offers the user an option to open a new tab within the application.

In the example embodiment, the application may execute a voice call with John's user device using WebRTC protocol as a peer-to-peer communication. John's user device may have the same functional description as the user device 200 of FIG. 2.

Figure 8:
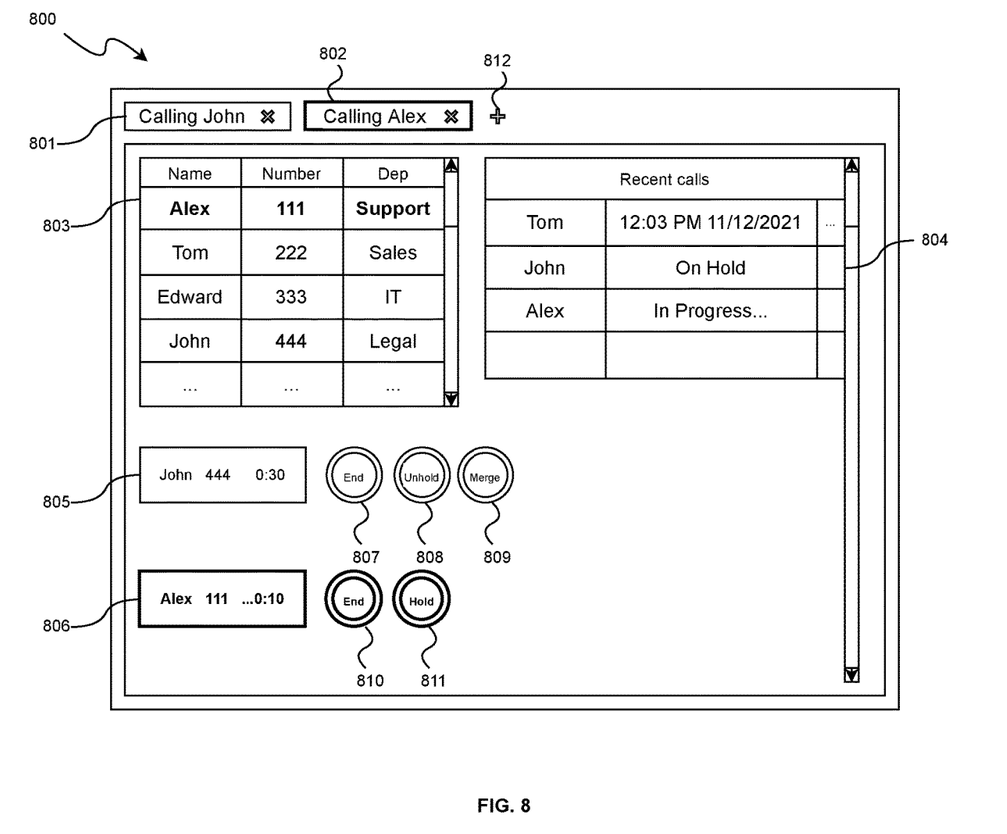
FIG. 8 is an example GUI of the application according to another example embodiment of the present disclosure.

FIG. 8 shows an example GUI 800 for the same application as in FIG. 7 for handling communications across tabs, but with a second tab opened. In this example, the user opened the second tab by pressing the open new tab button 707 and initiated a new call to Alex in the Support Department. GUI 800 may comprise a first tab indicator 801, a second tab indicator 802, a phonebook panel 803, a recent calls panel 804, ongoing call panels 805, 806, action buttons 807, 808, 809, 710, and 811, and an open new tab button 812. Contrary to elements of the GUI 700 of FIG. 7, GUI 800 comprises a second tab indicator 802 that states "Calling Alex". In the phonebook panel 803, Alex in the Support Department with phone number 111 is bold to indicate the user's selection. Further, the resent calls panel 804 indicates that John's call is now on hold, while the user talks to Alex. Additionally, in order to indicate the ongoing active call, the resent calls panel 804 indicates that the call to Alex is in progress. The ongoing call panel 805 indicates that the call to John has lasted 30 seconds. In some embodiments, since the call to John is now on hold, the timer may be paused. In this embodiment, the action buttons for the call to John offer the user the options to end the call (action button 807), unhold the call (action button 808) and merge the calls to start a conference call with both Alex and John (action button 809). At the same time, ongoing call panel 806 indicates that the call to Alex has lasted 10 seconds. The action buttons for the call to Alex offers the user the option to end the call (action button 810) and to hold the call (action button 811).

In the embodiment of FIG. 8, the application may drop the first communication within the first tab (original call to John) and carry out a voice call with Alex's user device using WebRTC protocol as peer-to-peer communication. Alex's user device may have the same functional description as the user device 200 of FIG. 2. At the same time, in an embodiment, the call to John may be put on hold by signaling an SIP INVITE (hold) command through the server, e.g., server 300 of FIG. 3, until user decides to unhold the call with John or merge both calls.

Alternatively, in other embodiment the call to John may be transferred from the first tab to the second tab using the local storage events of the browser, Broadcast Channel or post message method.

In an embodiment, the second tab may carry out both communications using the WebRTC protocol as peer-to-peer communication, but rather than formally placing John's call on hold, John's call may be muted. In this embodiment, both calls are carried out using WebRTC multi-peer communications, where each peer communication represents a peer-to-peer communication.

What is claimed is:

1. A computer-implemented method for handling communications across tabs, the method comprising:
   detecting a first communication via a first tab within an application;
   identifying an initiation of a second communication via a second tab within the application; and
   responsive to identifying the initiation, causing to pull the first communication from the first tab to the second tab such that the first communication and the second communication are carried out via the second tab.

2. The method of claim 1, wherein the first communication and the second communication are Web Real-Time Communication (WebRTC) communications.

3. The method of claim 1, wherein the first communication and the second communication are WebRTC communications and pulling the first multimedia communication from the first tab to the second tab comprises:
   switching, the first WebRTC communication into a first SIP communication; and
   pulling the first SIP communication from the first tab to the second tab such that the first SIP communication and the second WebRTC communication are carried out via the second tab.

4. The method of claim 1, wherein the first communication and second communication are WebRTC communications and pulling the first multimedia communication from the first tab to the second tab comprises:
   pulling the first WebRTC communication to the second tab such that that the first WebRTC communication and the second WebRTC communication are carried out via the second tab using WebRTC multi-peer communications, and where each peer communication of the WebRTC multi-peer communications represents a peer-to-peer communication.

5. The method of claim 1, wherein the application is a browser application.

6. The method of claim 1, wherein the application is a client application for accessing a web application.

7. The method of claim 1, further comprising: responsive to pulling the first communication from the first tab to the second tab, closing the first tab.

8. A non-transitory, computer-readable medium storing a set of instructions that, when executed by a processor, cause:
   detecting a first communication via a first tab within an application;
   identifying an initiation of a second communication via a second tab within the application; and
   responsive to identifying the initiation, causing to pull the first communication from the first tab to the second tab such that the first communication and the second communication are carried out via the second tab.

9. The non-transitory, computer-readable medium of claim 8, wherein the first communication and second communication are WebRTC communications.

10. The non-transitory, computer-readable medium of claim 8, wherein the first communication and second communication are WebRTC communications and the set of instructions that, when executed by a processor, further cause:
    switching, the first WebRTC communication into a first SIP communication; and pulling the first SIP communication from the first tab to the second tab such that the first SIP communication and the second WebRTC communication are carried out via the second tab.

11. The non-transitory, computer-readable medium of claim 8, wherein the first communication and second communication are WebRTC communications and the set of instructions that, when executed by a processor, further cause pulling the first WebRTC communication to the second tab such that that the first WebRTC communication and the second WebRTC communication are carried out via the second tab using WebRTC multi-peer communications, where each peer communication represents peer-to-peer communication.

12. The non-transitory, computer-readable medium of claim 8, wherein the application is a browser application.

13. The non-transitory, computer-readable medium of claim 8, wherein the application is a client application for accessing web application.

14. The non-transitory, computer-readable medium of claim 8, wherein the set of instructions that, when executed by a processor, further cause: responsive to pulling the first communication from the first tab to the second tab, closing the first tab.

15. A system for handling communications across tabs, the system comprising:
   a processor;
   a memory operatively connected to the processor and storing instructions that, when executed by the processor, cause:
   detecting a first communication via a first tab within an application;
   identifying an initiation of a second communication via a second tab within the application; and
   responsive to identifying the initiation, causing to pull the first communication from the first tab to the second tab such that the first communication and the second communication are carried out via the second tab.

16. The system of claim 15, wherein the first communication and second communication are WebRTC communications.

17. The system of claim 15, wherein the first communication and second communication are WebRTC communications and the instructions that, when executed by the processor, further cause:
   switching, the first WebRTC communication into a first SIP communication; and
   pulling the first SIP communication from the first tab to the second tab such that the first SIP communication and the second WebRTC communication are carried out via the second tab.

18. The system of claim 15, wherein the application is a browser application.

19. The system of claim 15, wherein the application is a client application for accessing web application.

20. The system of claim 15, wherein the instructions that, when executed by a processor, further cause: responsive to pulling the first communication from the first tab to the second tab, closing the first tab.

\* \* \* \* \*

UNITED STATES PATENT AND TRADEMARK OFFICE
CERTIFICATE OF CORRECTION

| | | |
|---|---|---|
| PATENT NO. | : 12,323,470 B2 | Page 1 of 1 |
| APPLICATION NO. | : 18/075849 | |
| DATED | : December 6, 2022 | |
| INVENTOR(S) | : David Tai-Wei Lee et al. | |

It is certified that error appears in the above-identified patent and that said Letters Patent is hereby corrected as shown below:

On the Title Page

Item (30), delete:
"Mar. 22, 2022 (WO) ................PCT/CN2022/082158"
And replace with:
Mar. 22, 2022 (CN) ................PCT/CN2022/082158

Signed and Sealed this
Twenty-second Day of July, 2025

Coke Morgan Stewart
*Acting Director of the United States Patent and Trademark Office*